US007309099B2

(12) United States Patent
Netzel et al.

(10) Patent No.: US 7,309,099 B2
(45) Date of Patent: Dec. 18, 2007

(54) ROOF ASSEMBLY FOR VEHICLES HAVING AN OPEN BODY

(75) Inventors: Peter Netzel, Hamburg (DE); Michael Neuberger, Öhringen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/531,199

(22) Filed: Sep. 12, 2006

(65) Prior Publication Data

US 2007/0228766 A1 Oct. 4, 2007

(30) Foreign Application Priority Data

Sep. 12, 2005 (DE) .............. 10 2005 043 508

(51) Int. Cl.
*B60J 7/00* (2006.01)
(52) U.S. Cl. .................. 296/108; 296/107.17; 296/121
(58) Field of Classification Search ............ 296/108, 296/107.17, 121, 122, 128, 224, 223, 219, 296/221, 107.08
See application file for complete search history.

(56) References Cited

U.S. PATENT DOCUMENTS

| 4,838,601 | A | | 6/1989 | Kolb |
| 5,286,077 | A | * | 2/1994 | Kinnanen ............... 296/107.09 |
| 5,833,300 | A | * | 11/1998 | Russske .................. 296/108 |
| 5,839,778 | A | * | 11/1998 | Schaible et al. ............ 296/121 |
| 6,033,008 | A | | 3/2000 | Mattila |
| 6,583,310 | B1 | | 6/2003 | Halpern |
| 6,595,574 | B2 | | 7/2003 | Shaw et al. |
| 6,652,017 | B2 | * | 11/2003 | Wagner et al. ......... 296/107.08 |
| 6,659,534 | B2 | * | 12/2003 | Willard ................. 296/108 |
| 6,695,386 | B1 | * | 2/2004 | Willard ................. 296/107.17 |
| 6,866,325 | B2 | * | 3/2005 | Willard ................. 296/108 |
| 6,913,307 | B2 | | 7/2005 | Hesse |
| 6,921,125 | B2 | * | 7/2005 | Netzel et al. .............. 296/108 |
| 6,953,217 | B2 | * | 10/2005 | Hasselgruber et al. ...... 296/121 |
| 7,063,371 | B2 | * | 6/2006 | Willard ................. 296/107.17 |
| 7,182,389 | B2 | * | 2/2007 | Bruder et al. ............. 296/108 |
| 7,255,385 | B2 | * | 8/2007 | Queveau et al. ........... 296/108 |
| 2003/0052511 | A1 | | 3/2003 | Shaw et al. |
| 2004/0004369 | A1 | * | 1/2004 | Neubrand et al. ......... 296/108 |
| 2004/0145210 | A1 | * | 7/2004 | Fuchs et al. .......... 296/107.08 |
| 2004/0222659 | A1 | | 11/2004 | Hesse |
| 2005/0140165 | A1 | * | 6/2005 | Heller et al. ............. 296/121 |
| 2006/0071502 | A1 | * | 4/2006 | Queveau et al. .......... 296/107.2 |
| 2006/0145509 | A1 | * | 7/2006 | Guillez et al. ......... 296/107.08 |

FOREIGN PATENT DOCUMENTS

| DE | 37 09 927 A1 | 10/1988 |
| DE | 101 44 515 C2 | 4/2003 |
| DE | 103 20 171 B4 | 12/2004 |

* cited by examiner

*Primary Examiner*—Kiran B. Patel
(74) *Attorney, Agent, or Firm*—Brooks Kushman P.C.

(57) ABSTRACT

A roof assembly for a vehicle includes a roof having roof parts. A rod kinematic system is connected to the roof parts to move the roof parts between a closed position of the roof in which the roof parts adjoin one another along a planar level to thereby cover the vehicle interior and a stored position of the roof in which the roof parts stack on top of one another to thereby expose the vehicle interior. First and second locking devices are associated with the roof parts. The locking devices have locking elements which engage one another to lock the stacked roof parts together when the roof is in the stored position.

20 Claims, 5 Drawing Sheets

ROOF ASSEMBLY FOR VEHICLES HAVING AN OPEN BODY

CROSS-REFERENCE TO RELATED APPLICATIONS

This application claims foreign priority benefits under 35 U.S.C. § 119(a)-(d) to DE 10 2005 043 508.4, filed Sep. 12, 2005, which is hereby incorporated by reference in its entirety.

BACKGROUND OF THE INVENTION

1. Field of the Invention

The present invention relates to a roof assembly for vehicles.

2. Background Art

Certain hardtop vehicle roofs have front and rear parts movable between a closed position in which the roof parts cover the vehicle interior and a stored (stowed or opened) position in which the roof parts are stored within a storage area of the vehicle thereby exposing the vehicle interior.

EP 0 884 208 A1 (corresponds to U.S. Pat. No. 6,033,008) describes such a roof. Locking parts associated with the roof parts stationarily secure the roof parts in position with respect to one another when the roof is in the closed position. The locking parts lock the front roof part with respect to the vehicle body when the roof is in the stored position.

DE 195 074 31 C1 (corresponds to U.S. Pat. No. 5,839,778) describes such a roof. A locking device fixes the front roof part against the cowl of the vehicle when the roof is in the closed position. The locking device fixes the front roof part to the vehicle when the roof is in the stored position. Parts of the locking device on the front roof part engage with vehicle body-side locking parts provided in the storage area when the roof is in the stored position.

FR 2 791 007 (corresponds to U.S. Pat. No. 6,583,310) describes such a roof. A locking device secures the roof parts in position with respect to one another and the vehicle body. Locking parts of the locking device support the roof parts with respect to the vehicle body when the roof is in the stored position.

SUMMARY OF THE INVENTION

An object of the present invention is a vehicle roof having roof parts movable by a rod kinematic system between a closed position in which the roof parts cover the vehicle interior and a stored (stowed or opened) position in which the roof parts are stacked within a storage area of the vehicle thereby exposing the vehicle interior in which the position of the roof parts with respect to one another when stacked together is ensured independently of control by the rod kinematic system.

In carrying out the above object and other objects, the present invention provides a roof assembly for a vehicle. The roof assembly includes a roof having roof parts. A rod kinematic system is connected to the roof parts to move the roof parts between a closed position of the roof in which the roof parts adjoin one another along a planar level to thereby cover the vehicle interior and a stored position of the roof in which the roof parts stack on top of one another to thereby expose the vehicle interior. First and second locking devices are associated with the roof parts. The locking devices having locking elements which engage one another to lock the stacked roof parts together when the roof is in the stored position.

In accordance with an embodiment of the present invention, a roof having roof parts is movable by a rod kinematic system between a closed position in which the roof parts are non-overlapping and are consecutively aligned in a plane to cover the vehicle interior and a stored (stowed or opened) position in which the roof parts are stacked and overlap one another (i.e., a packed position) to thereby expose the vehicle interior. Locking parts associated with the roof parts brace the roof parts when they are stacked upon one another thereby limiting the rod kinematic system essentially to a support function in the stored position of the roof as the stacked position of the roof parts relative to one another is fixed as a result of their reciprocal locking.

Such a design is practical for roofs having roof parts having a two-dimensionally flat, essentially planar design. This enables a compact layering of roof parts which for roof parts that are mutually connected and adjustable by a rod kinematic system requires a correspondingly projecting rod kinematic system. This is true for large-surface roofs. Such large-surface roofs starting from the cowl of the vehicle extend practically over the entire length of the vehicle and adjoin the rear hatch or tailgate. As such, starting from the top edge of the rear hatch or tailgate, a U-shaped roof section bordered on the front by the cowl in the form of a bridge results when the roof is open.

Within the scope of the present invention, the rod kinematic system connecting the roof parts preferably is designed as a four-bar kinematic linkage. Preferably, the four-bar kinematic linkage is in the form of a parallelogram linkage. The locking parts between the roof parts connect the roof parts, preferably in the respective front end region thereof. In the closed position of the roof, the roof parts are consecutively positioned. In the open position of the roof, the roof parts lie on top of one another.

A roof assembly in accordance with the present invention is practical for roofs having more than two roof parts. The locks which act between the roof parts are preferably operated by rotary latches or catch hooks. The rotary latches or catch hooks, when the roof parts meet in their stacked position, automatically swivel into their locked position and optionally are secured by corresponding ratchets or locking hooks.

With regard to the possibility of jointly opening the retaining elements for releasing the roof parts when the roof is closed, the ratchets or locking hooks, preferably together with the rotary latch, to be associated with a roof part, and for a roof having three roof parts, to be preferably associated with the center roof part, to optionally combine these parts of the lock into a module which as a prefabricated unit is fixed to the corresponding roof part, i.e., to the center roof part, thereby allowing joint actuation.

The locking of the roof parts according to the present invention is particularly advantageous for roofs in which, during opening of the roof, the roof parts are first moved into an overlapping stacked position at the rear of the vehicle and then are brought in a stack to a stored position in which they are situated in an upside-down position in the rear floor region of the vehicle, or optionally in a position at a distance from the floor, preferably at the level of the midline of the vehicle, thereby allowing advantageous storage possibilities despite the fact that when the roof is closed the rear space of the vehicle is available overall as a storage space or for other purposes.

To move the stacked roof part package into the upside-down position, a rotary guide rod assembly operably connected to the roof parts swivels the roof part package about a swivel axis on the vehicle body side. The swivel axis preferably is stationary with respect to the vehicle body. The swivel axis may be associated with an adjustable bracket so that by adjusting the height of the bracket, even when the rotary guide rod assembly has short arms, large differences in height between the roof level and the storage level may be achieved for the roof part package that is swivelled into the upside-down position.

The roof is attached to the rotary guide rod assembly by the rear roof part relative to the direction of travel. It is possible to stationarily mount the rear roof part to the rotary guide rod or to connect the rear roof part to the rotary guide rod by a rod system. Once again, a four-bar kinematic linkage preferably is used as the rod system. It is within the scope of the present invention to provide an effective lock in the stacked position of the roof when the rear roof part is mounted on the rotary guide rod assembly by a rod system.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
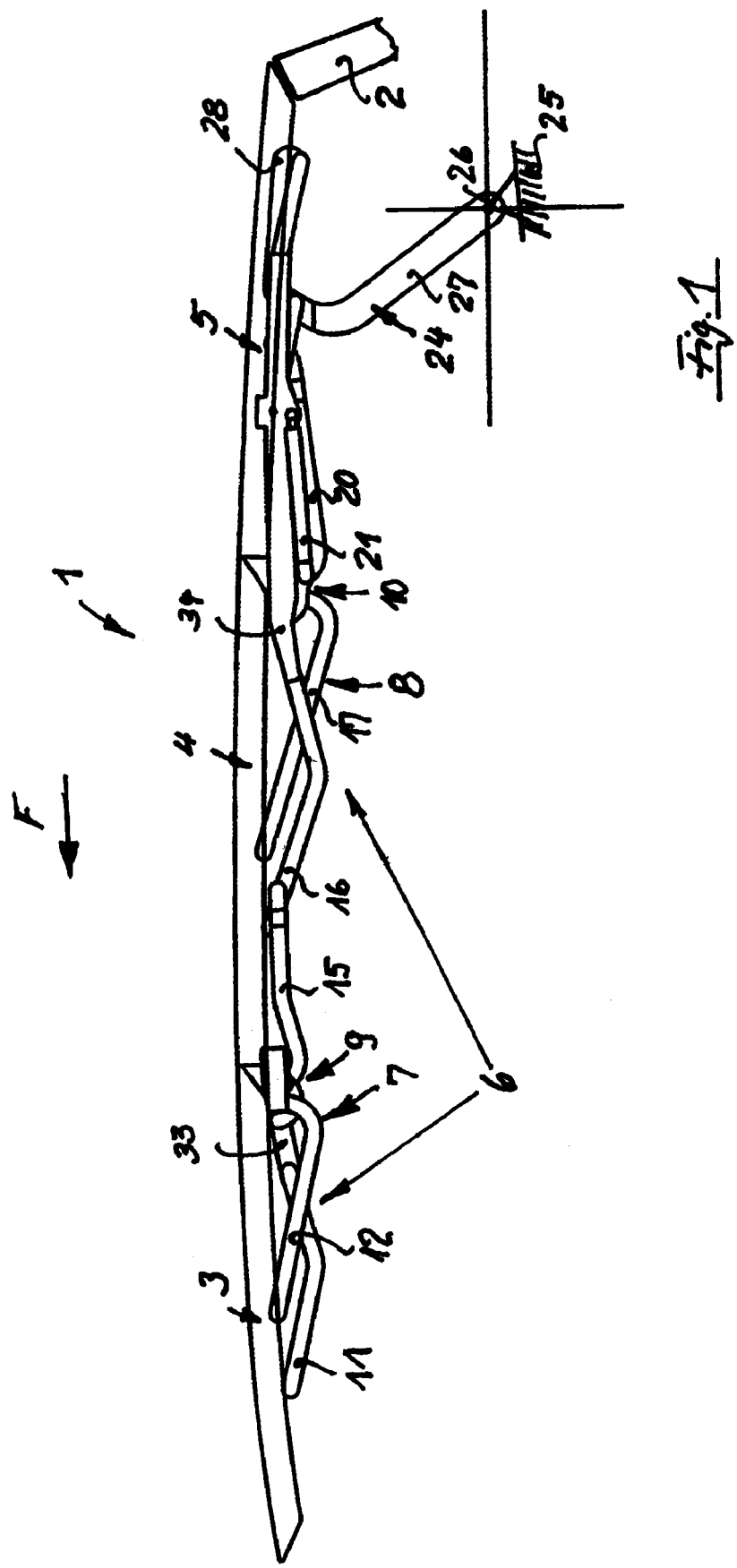
FIG. 1 illustrates a vehicle roof in accordance with an embodiment of the present invention, the roof having three roof parts mutually supported and adjustable with respect to one another by a rod kinematic system between a closed position in which the roof parts are consecutively positioned and form an essentially planar roof level and a stored (stowed or opened) in which the roof parts are stacked on top of one another, the roof parts being adjustable with respect to one another by a rotary guide rod assembly associated with the rear roof part, for the vehicle body the rotary guide assembly having a recess for accommodating the roof in its closed position.
Figure 2:
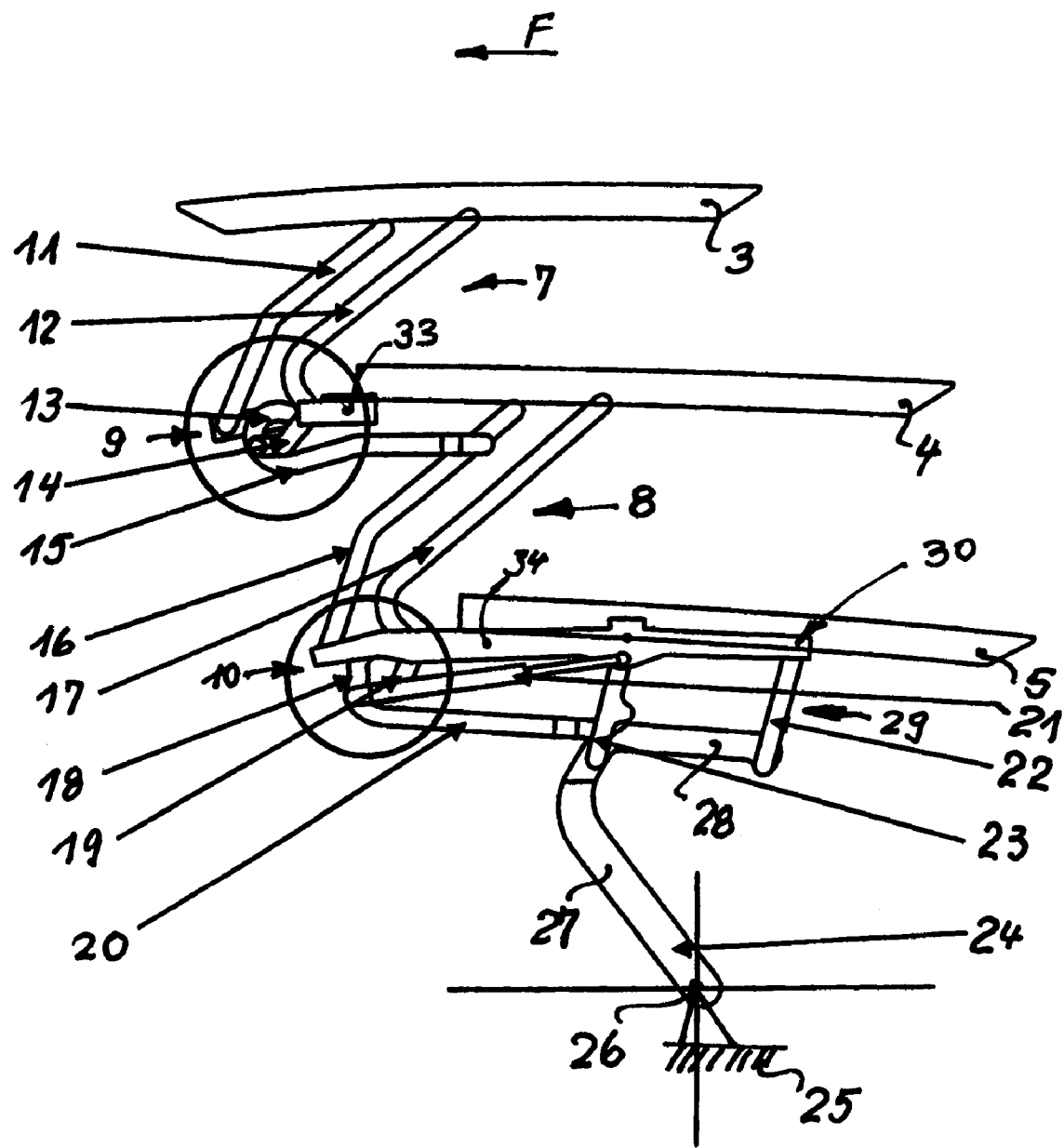
FIG. 2 illustrates the roof in an intermediate position during its transfer from the closed position to the stored position with the mutual support of the roof parts by the rod kinematic system and the connection of the roof to the rotary guide roof assembly being shown.
Figure 3:
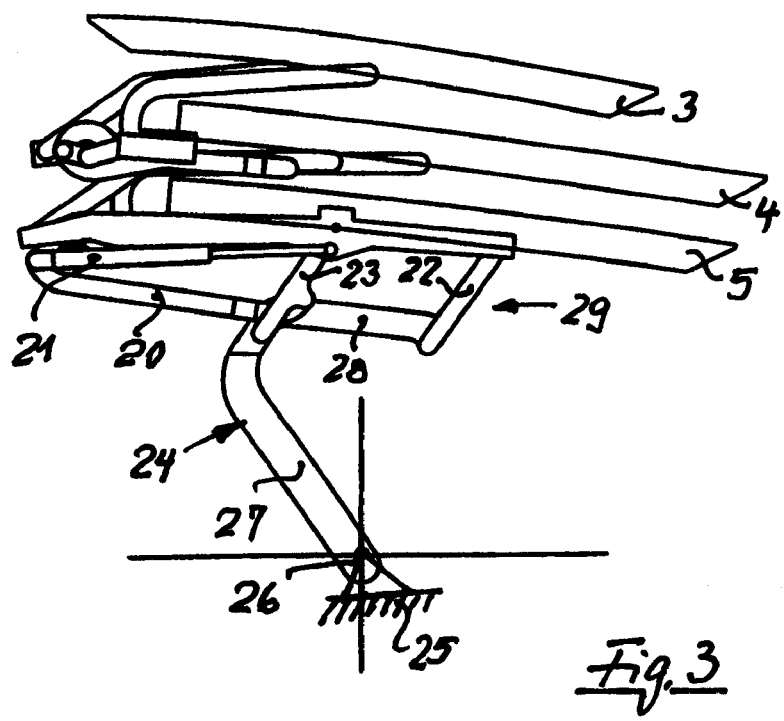
FIG. 3 illustrates the roof in a transition position in which the roof parts meet to form a roof part stack situated at the roof level during its transfer from the intermediate position to the stored position.
Figure 4:
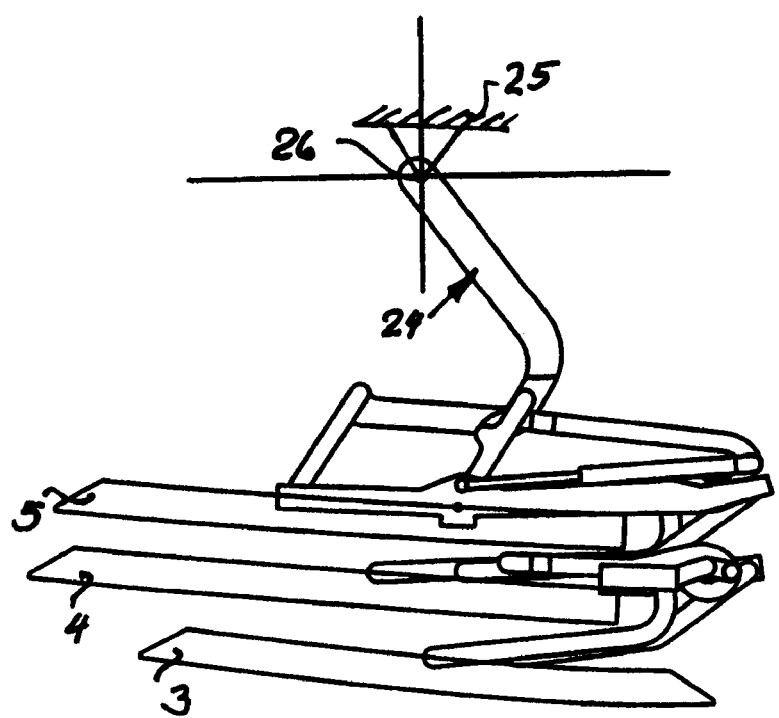
FIG. 4 illustrates the roof in the stored position in which the roof part stack is swivelled to an upside-down position.

Referring now to FIGS. 1, 2, 3, and 4, a vehicle roof 1 in accordance with an embodiment of the present invention is shown. Roof 1 includes a plurality of dimensionally stable roof parts. In the illustrated embodiment, roof 1 includes a front roof part 3, a center roof part 4, and a rear roof part 5. In other embodiments, roof 1 includes just two roof parts or includes more than three roof parts. Roof 1 is movable between a closed position in which roof parts 3, 4, 5 cover the interior of a vehicle having an open body and a stored (stowed or opened) position in which the roof parts are stacked on top of one another and stored in a storage area of the vehicle thereby exposing the vehicle interior. In the closed position of roof 1, the roof is substantially planar with roof parts 3, 4, 5 being consecutively positioned and adjoining one another as shown in FIG. 1. In the stored position of roof 1, the roof is stacked with roof parts 3, 4, 5 lying one on top of the other in a layered manner with rear roof part 5 situated above center roof part 4 and center roof part 4 situated above front roof part 3 as shown in FIG. 4.

The vehicle includes a vehicle body schematically indicated by reference numeral 25. Roof 1 has a roof recess open towards the rear which corresponds to a recess in rear vehicle body 25. The recess in rear vehicle body 25 is closable by a tailgate or rear hatch 2 at the back side. Tailgate or rear hatch 2 adjoins roof 1 at the back side.

A rod kinematic system 6 mutually supports roof parts 3, 4, 5. Rod kinematic system 6 connects to roof parts 3, 4, 5 to move the roof parts between the closed and stored positions of roof 1. Rod kinematic system 6 includes a first guide rod assembly 7 and a second guide rod assembly 8. First guide rod assembly 7 supports front and center roof parts 3, 4. Second guide rod assembly 8 supports center and rear roof parts 4, 5. First and second guide rod assemblies 7, 8 are formed by respective four-bar kinematic linkages.

A first five-bar linkage 9 is situated as the drive connection for first guide rod assembly 7. A second five-bar linkage 10 is situated as the drive connection for second guide rod assembly 8. First guide rod assembly 7 with first five-bar linkage 9 and second guide rod assembly 8 with second five-bar linkage 10 movably adjust roof parts 3, 4, 5 between the closed position of roof 1 in which the roof parts 3, 4, 5 are extended in a plane and the stored position of roof 1 in which roof parts 3, 4, 5 are stacked and layered one on top of the other. In the stored position of roof 1, roof parts 3, 4, 5 are layered with a small distance therebetween to form a compact roof package.

First guide rod assembly 7 between roof parts 3, 4 includes a first control rod 11 and a first main guide rod 12. First five-bar linkage 9 is situated in the drive of first guide rod assembly 7 to provide drive action on first guide rod 12 via a first coupling rod 15.

Second guide rod assembly 8 between roof parts 4, 5 includes a second control rod 16 and a second main guide rod 17. Second five-bar linkage 10 is situated in the drive of second guide rod assembly 8 to provide drive action on second guide rod 17 via a second coupling rod 20.

First coupling rod 15, starting from a linkage to second control rod 16 of second guide rod assembly 8, is connected via first five-bar linkage 9 to first guide rod 12. First five-bar linkage 9 includes a first pendulum rod 13 and a first tension rod 14. First pendulum rod 13 is situated in front of first tension rod 14 as seen in the direction of vehicle forward travel F. First pendulum rod 13, together with first control rod 11 and first guide rod 12, is linked to a first bracket 33. First bracket 33 is attached to center roof part 4 and projects forward with respect to center roof part 4. First pendulum rod 13 is also linked to first coupling rod 15. First tension rod 14 has an offset linkage with respect to first coupling rod 15 in the direction opposite the direction of travel F for linking first pendulum rod 13. First tension rod 14 is further linked to an extension of first guide rod 12 projecting beyond the linkage between first guide rod 12 and first bracket 33. As a result, the drive action for first guide rod assembly 7 is achieved via first five-bar linkage 9.

In a corresponding manner, the drive action for second guide rod assembly 8 is achieved via second five-bar linkage 10. To this end, second coupling rod 20 is connected via second five-bar linkage 10 to second guide rod 17. Second five-bar linkage 10 includes a second pendulum rod 18 and a second tension rod 19. Second pendulum rod 18 is situated in front of second tension rod 19 as seen in the direction of vehicle forward travel F. Second pendulum rod 18, together with second control rod 16 and second guide rod 17, is linked to a second bracket 34. Second bracket 34 is attached to rear roof part 5 and projects forward with respect to rear roof part 5. Second pendulum rod 18 is also linked to second coupling rod 20. Second tension rod 19 is linked to an extension of second guide rod 17 projecting beyond the linkage between second guide rod 17 and second bracket 34. As a result, the drive action for second guide rod assembly 8 is achieved via second five-bar linkage 10.

A rotary guide rod 24 connects rear roof part 5 to vehicle body 25. Rotary guide rod 24 includes a first leg 27 connected at one end to vehicle body 25 such that the rotary guide rod is rotatable about a rotational axis 26, which is stationary with respect to vehicle body 25. In the closed position of roof 1 (as shown in FIG. 1), first leg 27 rises forward at an angle in the direction of travel F and a second leg 28 of rotary guide rod 24 extends backward and is situated at an angle with respect to first leg 27. Second leg 28 forms the supporting base for a third guide rod assembly 29 by which rear roof part 5 is connected to rotary guide rod 24.

Third guide rod assembly 29 is formed by a four-bar kinematic linkage. Third guide rod assembly 29 includes a third main guide rod 22 and a third control rod 23. Third guide rod 22 and third control rod 23 have respective linkage points at one end to second leg 28 of rotary guide rod 24. Likewise, third guide rod 22 and third control rod 23 have respective linkage points at their other end to a support structure 30 of rear roof part 5. Support structure 30 runs in second bracket 34 in the direction of forward vehicle travel F (i.e., towards its front) to which second control rod 16 and second guide rod 17 of second guide rod assembly 8 are linked. As a result, roof parts 3, 4, 5, move relative to rotary guide rod 24 in response to retraction and extension of a drive cylinder 21, which acts as an actuator.

Figure 5:
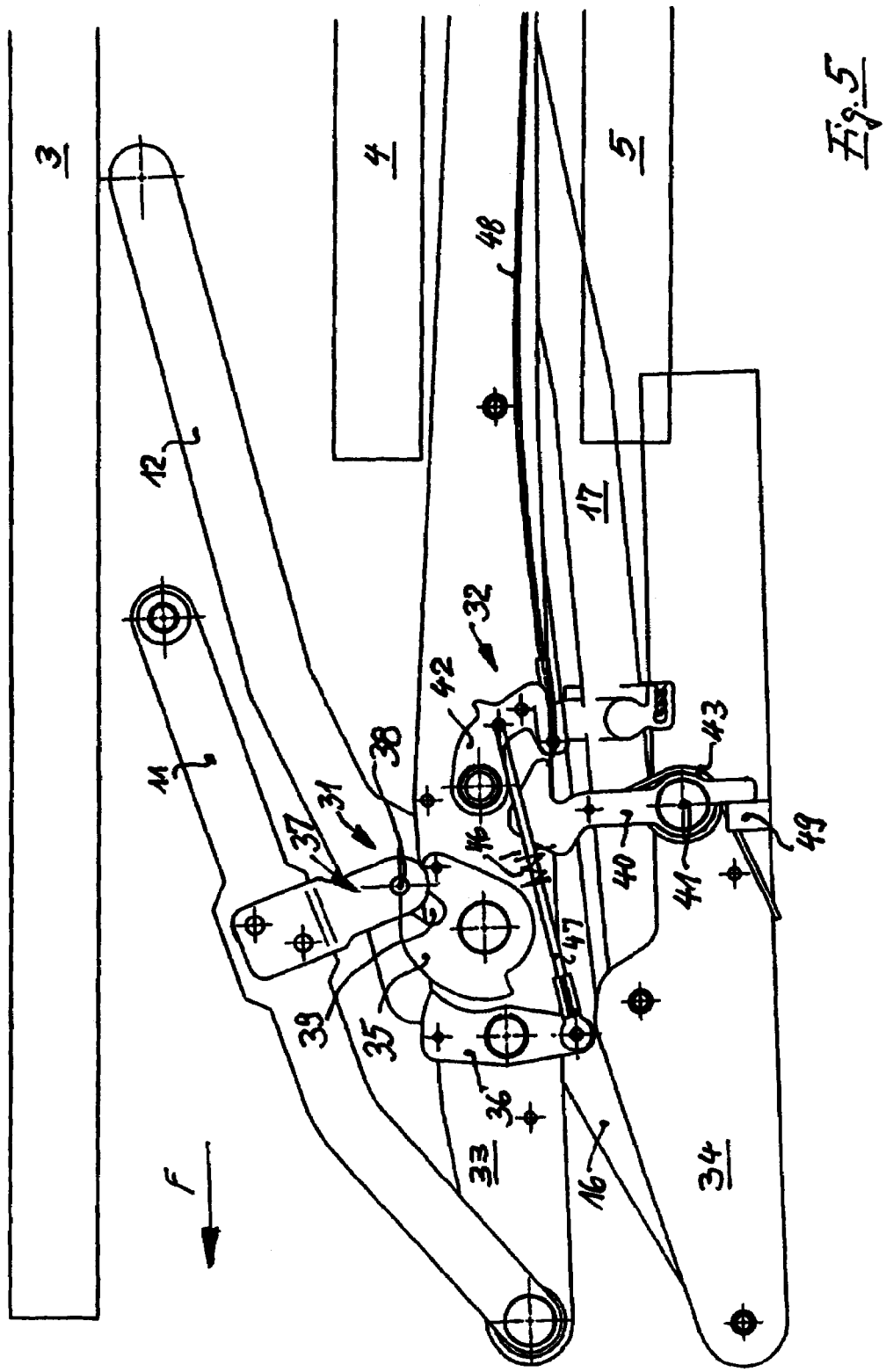
FIG. 5 illustrates a lock associated with the roof parts for fixing the stacked roof parts with respect to one another with the lock being shown in its open position.
Figure 6:
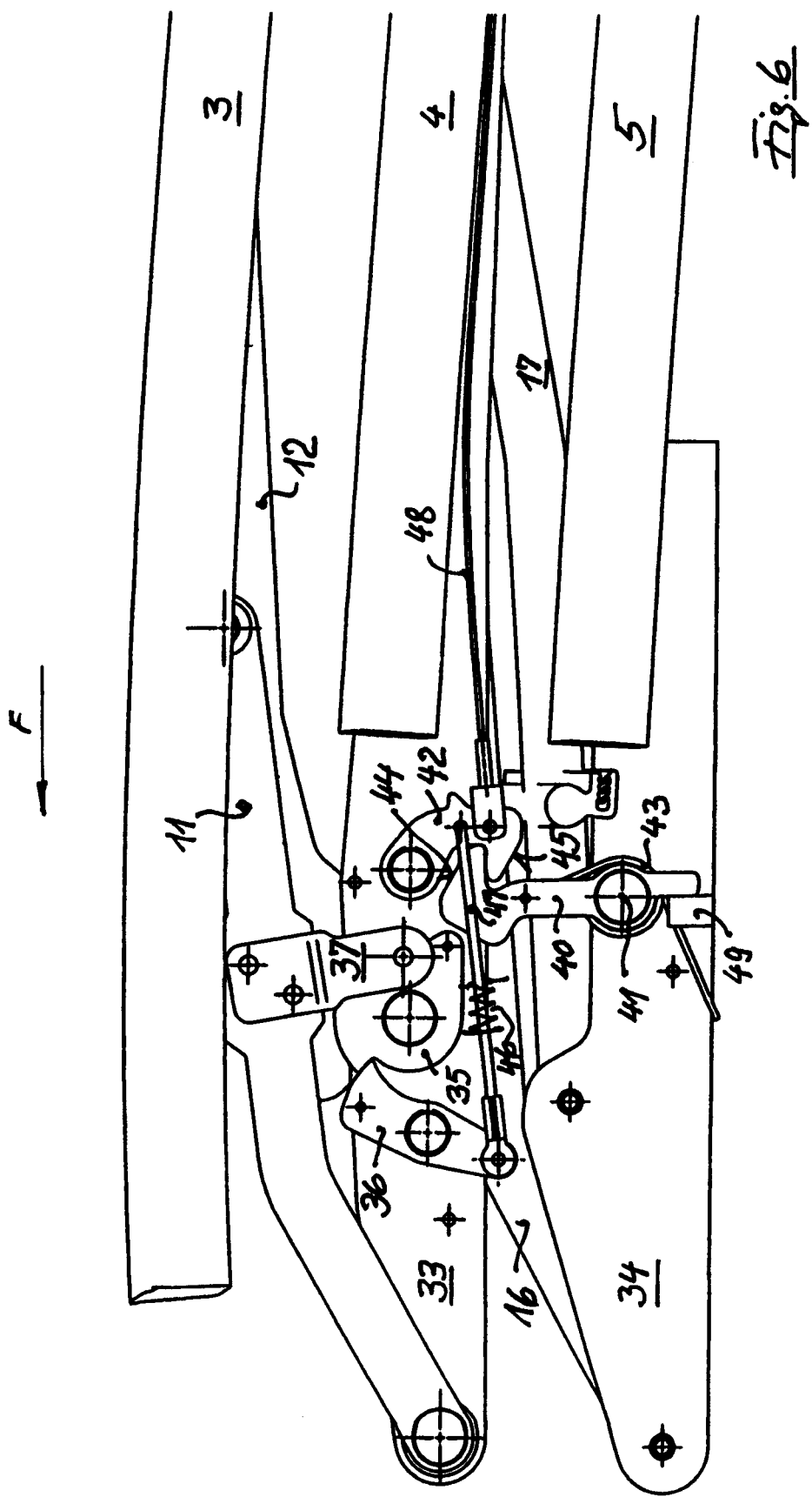
FIG. 6 illustrates the lock associated with the roof parts for fixing the stacked roof parts with respect to one another with the lock being shown in its locked position.

Referring now to FIGS. 5 and 6, with continual reference to FIGS. 1, 2, 3, and 4, further description regarding the stacking of roof parts 3, 4, 5 on top of one another in accordance with the embodiment of the present invention will now be provided. As described, first guide rod assembly 7 between roof parts 3, 4 and second guide rod assembly 8 between roof parts 4, 5 are operably connected to the roof parts to move the roof parts between the closed and opened positions of roof 1. In the closed position of roof 1, roof parts 3, 4, 5 consecutively align such that roof 1 has a planar form. In the opened position of roof 1, roof parts 3, 4, 5 are stacked on top of one another in a layered manner. FIG. 6 illustrates roof parts 3, 4, 5 in their fully stacked position and FIG. 5 illustrates roof parts 3, 4, 5 approaching the fully stacked position.

First guide rod assembly 7 situated between roof parts 3, 4 is illustrated in FIGS. 5 and 6 by first control rod 11 and first guide rod 12. First control rod 11 and first guide rod 12 are linked to center roof part 4 at first bracket 33, which projects in the direction of forward travel F. Likewise, second guide rod assembly 8 situated between roof parts 4, 5 is illustrated in FIGS. 5 and 6 by second control rod 16 and second guide rod 17. Second control rod 16 and second guide rod 17 are linked to rear roof part 5 at second bracket 34, which projects in the direction of forward travel F.

A first locking device 31 is between roof parts 3, 4 for reciprocal locking of roof parts 3, 4. A second locking device 32 is between roof parts 4, 5 for reciprocal locking of roof parts 4, 5.

First locking device 31 includes a rotary latch 35 and a ratchet 36 both on first bracket 33. A locking part 37 of first locking device 31 is associated with first control rod 11. Locking part 37 runs toward intercepting jaw 39 of rotary latch 35 in a locking bolt 38. Ratchet 36 is spring-loaded in the direction of its locked position with respect to rotary latch 35. Rotary latch 35 is spring-loaded for locking bolt 38 in the direction of the opening and receiving position of rotary latch 35 illustrated in FIG. 5.

Second locking device 32 includes a catch hook 40. Catch hook 40 is fixed to second bracket 34 so as to be rotatable about an axis 41. Catch hook 40 is loaded via a spring 43 in the direction of its catch position with respect to a locking hook 42. Catch hook 40 is loaded via a stop 49 for limitation of its motion in the opposite direction. Locking hook 42 is mounted on first bracket 33 and is spring-loaded with respect to catch hook 40 in the direction of the catch position of the locking hook. Catch hook 40 and locking hook 42 respectively have oppositely oriented back surfaces 44, 45 which optionally form guide and deflection surfaces.

When roof parts 3, 4, 5 are brought together in the transition stacked position shown in FIG. 3, the roof parts initially assume the open stacked position shown in FIG. 5 which approaches the locked stacked position shown in FIG. 6. In the open stacked position shown in FIG. 5, ratchet 36 is still situated in a disengaged position relative to rotary latch 35, locking hook 42 is still situated in a disengaged position relative to catch hook 40, and locking bolt 38 is still situated in front of intercepting jaw 39.

Roof parts 3, 4, 5 move from the open stacked position shown in FIG. 5 and brought together to form the fully stacked roof part package in order to be transferred to the locked, packed position shown in FIG. 6. To reach the locked stacked position shown in FIG. 6, locking bolt 38 locks into intercepting jaw 39 and then swivels rotary latch 35 until ratchet 36 reaches an engaged position with rotary latch 35 as shown in FIG. 6. Ratchet 36 is spring-loaded by a spring 46 in the direction of this engaged position. Ratchet 36 is connected to locking hook 42 via an actuating rod 47. When ratchet 36 drops into rotary latch 35, locking hook 42 assumes an engaged position with catch hook 40.

The resulting locked position for the fully stacked roof part package may be released by tension means connection 48 such that a tensile force applied to locking hook 42 and ratchet 36 returns roof parts 3, 4, 5 to the released position shown in FIG. 5. In the released position, roof parts 3, 4, 5 are enabled to be adjusted with respect to one another and move to the closed position of roof 1.

In the locked position of roof parts 3, 4, 5 shown in FIG. 6, rotary guide rod 27 may be swivelled about rotational axis 26 to swivel the stacked roof parts 3, 4, 5 as a roof part package about rotational axis 26 while the roof parts maintain their relative position with respect to one another. The stacked roof parts 3, 4, 5 may be swivelled to an upside-down position shown in FIG. 4. The upside-down position of roof parts 3, 4, 5 corresponds to the stored position of roof 1 in which roof 1 (i.e., upside-down stacked roof parts 3, 4, 5) is preferably stored in a rear lower floor region of the vehicle.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A roof assembly for a vehicle, the roof assembly comprising:
 a roof having a plurality of roof parts;
 a rod kinematic system connected to the roof parts to move the roof parts between a closed position of the roof in which the roof parts adjoin one another along a planar level to thereby cover the vehicle interior and a stored position of the roof in which the roof parts stack on top of one another to thereby expose the vehicle interior; and
 first and second locking devices associated with the roof parts, the locking devices having locking elements which engage one another to lock the stacked roof parts together when the roof is in the stored position.

2. The roof assembly of claim 1 wherein:
 the roof parts are two-dimensional flat roof parts.

3. The roof assembly of claim 1 wherein:
 the roof parts are substantially planar.

4. The roof assembly of claim 1 wherein:
 the roof parts include two or more roof parts.

5. The roof assembly of claim 1 wherein:
 the roof parts include a front roof part, a center roof part, and a rear roof part;
 wherein when the roof parts are stacked on top of one another, the front roof part is situated above the center roof part and the center roof part is situated above the rear roof part.

6. The roof assembly of claim 5 wherein:
 the rod kinematic system includes first and second guide rod assemblies for moving the roof parts between the closed and stored positions of the roof, wherein each guide rod assembly is a four-bar kinematic linkage;
 wherein the first guide rod assembly is connected between the front and center roof parts, and the second guide rod assembly is connected between the center and rear roof parts.

7. The roof assembly of claim 6 further comprising:
 a first bracket connected to the center roof part and projecting forward from a front end region of the center roof part into a region of the linkages of the first guide rod assembly; and
 a second bracket connected to the rear roof part and projecting forward from a front end region of the rear roof part into a region of the linkages of the second guide rod assembly;
 wherein when the roof parts are stacked on top of one another, the brackets stack on top of one another and the locking parts of the locking devices lie on top of one another at the stacked brackets.

8. The roof assembly of claim 7 wherein:
 the first locking device is between the front and center roof parts, wherein the locking elements of the first locking device include a rotary latch associated with the center roof part and a locking part associated with the front rear part, wherein the rotary latch and the locking part engage one another when the roof parts are moved to stack on top of one another in order to lock the stacked roof parts together when the roof is in the stored position.

9. The roof assembly of claim 8 wherein:
 the locking elements of the first locking device further include a ratchet associated with the center roof part, wherein the ratchet is associated with the rotary latch to lock the rotary latch and the locking part together when the rotary latch and the locking part engage one another.

10. The roof assembly of claim 7 wherein:
 the second locking device is between the center and rear roof parts, wherein the locking elements of the second locking device include a locking hook associated with the center roof part and a catch hook associated with the center roof part, wherein the catch hook and the locking hook engage one another when the roof parts are moved to stack on top of one another in order to lock the stacked roof parts together when the roof is in the stored position.

11. The roof assembly of claim 10 wherein:
 the catch hook and the locking hook are spring-loaded in their engaged position, and movable by reciprocal deflection surfaces when brought together against an elastic force into the engaged position.

12. The roof assembly of claim 8 wherein:
 the second locking device is between the center and rear roof parts, wherein the locking elements of the second locking device include a locking hook associated with the center roof part and a catch hook associated with the center roof part, wherein the catch hook and the locking hook engage one another when the roof parts are moved to stack on top of one another in order to lock the stacked roof parts together when the roof is in the stored position.

13. The roof assembly of claim 12 wherein:
 the catch hook and the locking hook are spring-loaded in their engaged position, and movable by reciprocal deflection surfaces when brought together against an elastic force into the engaged position.

14. The roof assembly of claim 12 wherein:
 the ratchet of the first locking device and the locking hook of the second locking device each have the same rotational direction in the direction of their engaged position.

15. The roof assembly of claim 14 further comprising:
 an actuating unit common to the ratchet and the locking hook for moving the ratchet and the locking hook.

16. The roof assembly of claim 15 wherein:
 the actuating unit includes an actuating rod connecting the ratchet and the locking hook, wherein the ratchet and the locking hook are movable in a direction of a release position of the actuating rod by the actuating unit.

17. The roof assembly of claim 8 further comprising:
 a rotary guide rod connected to the rear roof part, the rotary guide assembly rotatable about a rotational axis, wherein the stacked roof parts swivel about the rotational axis to an upside-down stacked position as the rotary guide rod rotates about the rotational axis.

18. The roof assembly of claim 17 wherein:
 the rotary guide rod is connected to a vehicle body at the rotational axis such that the stacked roof parts swivel about the vehicle body as the rotary guide rod rotates about the rotational axis.

19. The roof assembly of claim 17 wherein:
 the rotary guide rod is stationarily connected to the rear roof part.

20. The roof assembly of claim 17 wherein:
 the rotary guide rod is connected to the rear roof part via a rod kinematic system, wherein the rod kinematic system is a four-bar linkage.

* * * * *